US008544012B2

(12) United States Patent
Liu (10) Patent No.: US 8,544,012 B2
(45) Date of Patent: *Sep. 24, 2013

(54) CHANGING A SCHEDULER IN A VIRTUAL MACHINE MONITOR (75) Inventor: Benjamin Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,189

(22) Filed: May 15, 2012

(65) Prior Publication Data

US 2012/0227050 A1 Sep. 6, 2012

Related U.S. Application Data (63) Continuation of application No. 10/580,792, filed as application No. PCT/CN2005/002305 on Dec. 23, 2005, now Pat. No. 8,181,179.

(51) Int. Cl.
G06F 9/46 (2006.01)
G06F 9/455 (2006.01)

(52) U.S. Cl.
USPC ............................... 718/102; 718/1

(58) Field of Classification Search
USPC ........................................................ 718/102
See application file for complete search history.

(56) References Cited

U.S. PATENT DOCUMENTS

| 6,961,941 | B1 | 11/2005 | Nelson et al. |
| 7,296,271 | B1 | 11/2007 | Chalmer et al. |
| 2002/0073129 | A1 | 6/2002 | Wang et al. |
| 2003/0023655 | A1 | 1/2003 | Sokolov et al. |
| 2003/0037089 | A1 | 2/2003 | Cota-Robles et al. |
| 2003/0122871 | A1 | 7/2003 | Darlet et al. |
| 2005/0144332 | A1 | 6/2005 | Nellitheertha |
| 2005/0198303 | A1 | 9/2005 | Knauerhase et al. |
| 2005/0251806 | A1 | 11/2005 | Auslander et al. |

FOREIGN PATENT DOCUMENTS

| GB | 2355319 A | 4/2001 |
| WO | 2007/071117 A1 | 6/2007 |

OTHER PUBLICATIONS

Office Action Received for Chinese Patent Application No. 200580052396.3, mailed on Jan. 30, 2012, 5 pages of Office Action and 9 pages of English Translation.
Office Action Received for Chinese Patent Application No. 200580052396.3, mailed on Nov. 27, 2009, 6 pages of Office Action and 10 pages of English Translation.
Office Action Received for European Patent Application No. 05824021.9, mailed on Jun. 7, 2010, 6 page.
International Preliminary Report on Patentability Received for the PCT Application No. PCT/CN05/002305, mailed on Jun. 24, 2008, 5 pages.
International Search Report and Written Opinion Received for the PCT Application No. PCT/CN2005/0022305, mailed on Oct. 26, 2006, 6 pages.

(Continued)

Primary Examiner — Meng An
Assistant Examiner — Blake Kumabe
(74) Attorney, Agent, or Firm — Caven & Aghevli LLC (57) ABSTRACT Machine-readable media, methods, and apparatus are described to change a first scheduler in the virtual machine monitor. In some embodiments, a second scheduler is loaded in a virtual machine monitor when the virtual machine monitor is running; and then is activated to handle a scheduling request for a scheduling process in place of the first scheduler, when the virtual machine monitor is running.

24 Claims, 5 Drawing Sheets

(56) References Cited

OTHER PUBLICATIONS

Office Action Received for Chinese Patent Application No. 200580352396.3, mailed on Jun. 4, 2012, 5 pages of Office Action and 5 pages of English Translation.
Notice of Allowance Received for the U.S. Appl. No. 10/580,792, mailed on Jan. 23, 2012, 5 pages.
Office Action Received for U.S. Appl. No. 10/580,792, mailed on Jul. 21. 2010, 22 pages.
Office Action Received for U.S. Appl. No. 10/580,792, mailed on Dec. 8, 2010. 16 pages.
Office Action Received for U.S. Appl. No. 10/580,792, mailed on Sep. 29, 2011, 15 pages.
Extended European Search Report Received for the European Patent Application No. 05824021.9, mailed on Jan. 12, 2010, 7 pages.

CHANGING A SCHEDULER IN A VIRTUAL MACHINE MONITOR

RELATED APPLICATIONS

This application is a continuation of, and claims priority to, U.S. application Ser. No. 10/580,792, entitled "CHANGING A SCHEDULER IN A VIRTUAL MACHINE MONITOR," filed on May 26, 2006, now patented under the U.S. Pat. No. 8,181,179, issued on May 15, 2012; which is a United States national filing of International PCT Application Serial No. PCT/CN05/002305, entitled "CHANGING A SCHEDULER IN A VIRTUAL MACHINE MONITOR," filed on Dec. 23, 2005, which are hereby incorporated herein by reference for all purposes.

BACKGROUND

A virtual machine (VM) architecture logically partitions a physical machine, such that the underlying hardware of the machine is time-shared and appears as one or more independently operation virtual machines. A computer platform in a virtual machine environment may comprise a virtual machine monitor (VMM) that may create a plurality of virtual machines and runs on the computer platform to facilitate for other software the abstraction of one or more virtual machines.

The virtual machine monitor may comprise a scheduler to allocate time slots for each virtual machine to run and prioritize or balance the resource usage among the virtual machines. Usually, a scheduler may implement a specific scheduling mechanism that may fit specific situations, such as Borrowed Virtual Time (BVT) algorithm, Round Robin algorithm, etc.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for changing a scheduler in a virtual machine monitor. in the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
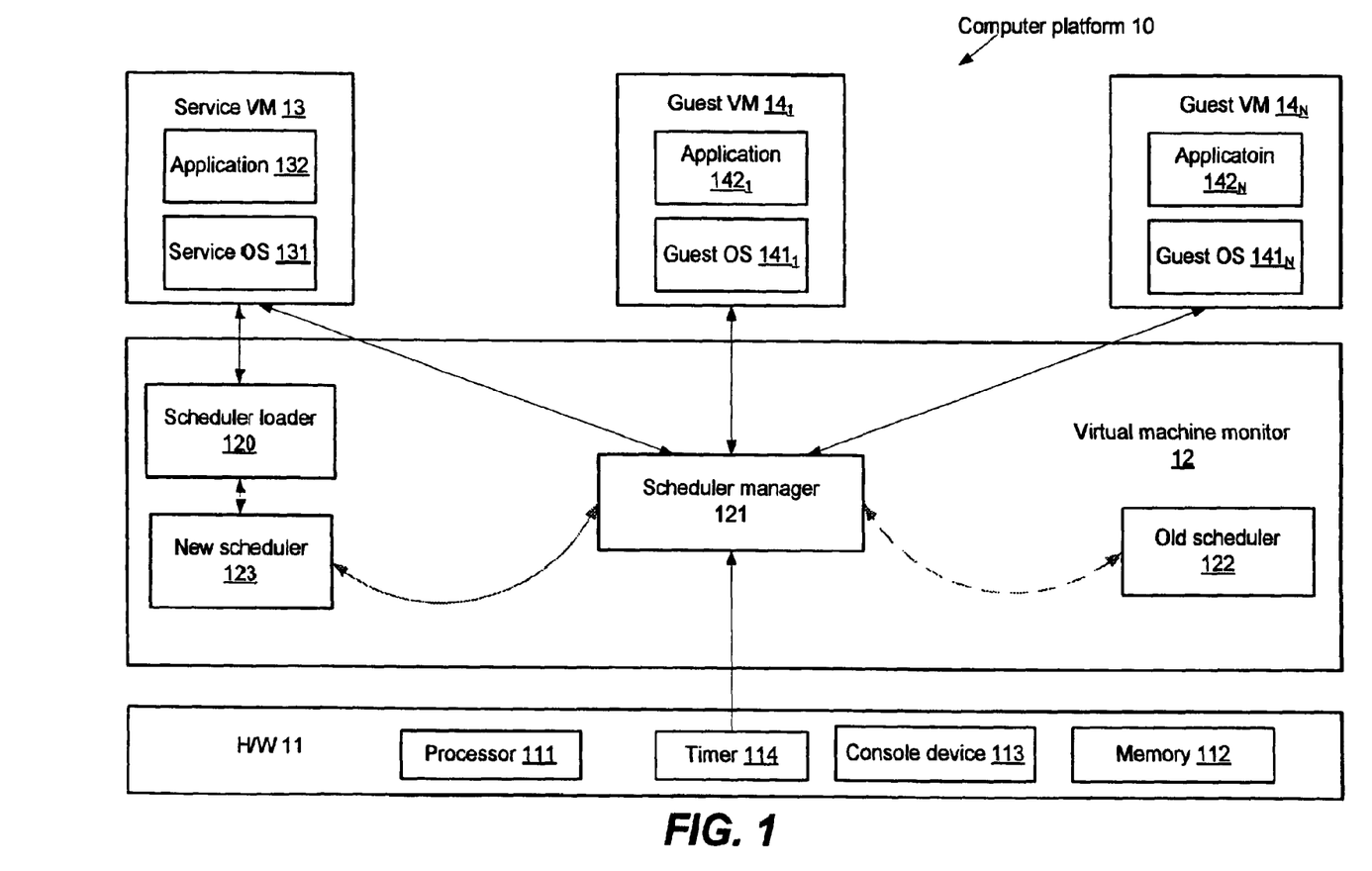
FIG. 1 shows an embodiment of a computer platform having a virtual machine monitor to change a scheduler.

An embodiment of a computer platform 10 having a virtual machine monitor to change a scheduler is shown in FIG. 1. The computer platform 10 may comprise an underlying hardware machine 11 having one or more processors 111, memory 112, console device 113, timer 114, and the like. The computer platform 10 may further comprise a plurality of virtual machines and a virtual machine monitor. The plurality of virtual machines run their own operating systems and application software, such as a service virtual machine 13 running a service operating system 131 and a service application 132 and one or more guest virtual machines $14_1$-$14_N$ running their own guest operating systems $141_1$-$141_N$ and guest applications $142_1$-$142_N$. The virtual machine monitor 12 may be responsible for processor(s)/memory virtualization/stimulation, interrupt handling, virtual machine scheduling, etc. A non-exhaustive list of examples for the computer platform 10 may include mainframe computer, mini-computer, personal computer, portable computer, laptop computer and other devices for transceiving and processing data.

Various components in the computer platform 10 may invoke the virtual machine monitor 12 to perform a scheduling process, e.g., to determine a next owner of underlying switch devices for a next assigned time slot, or to determine a priority of a virtual machine, etc. Usually, the switch devices may be owned by a running virtual machine (e.g., a service virtual machine 13, or a guest virtual machine $14_1$-$14_N$) in a time slot assigned by a scheduler In the virtual machine monitor and therefore have a focus on which virtual machine is currently active. Examples of the switch device may comprise the processor 111 and console device 113, wherein the console device 13 may comprise a frequently used I/O device, such as a keyboard, mouse, etc.

The service operating system 131 in the service virtual machine 13 may send a scheduling request for the scheduling process to the virtual machine monitor 12. For example, when the service operating system 131 monitors a running guest virtual machine $14_1$-$14_N$, and finds a failure in the guest virtual machine, e.g., a guest operating system fault, the service operating system 131 may send a scheduling request to the virtual machine monitor 12 to change the owner of the switch devices.

The guest operating system $141_1$-$141_N$ in the guest virtual machine $14_1$-$14_N$ may also send a scheduling request to the virtual machine monitor 12. For example, when the guest operating system $141_1$-$141_N$ is executing a device input/output operation and waiting for a response from the device, the guest operating system may send the scheduling request to yield the ownership of the switch devices so that other virtual machine may make a use of the switch devices.

The timer 114 in the underlying hardware, e.g., a programmable interval timer, may also send a scheduling request to the virtual machine monitor 12. For example, when the time slot assigned to the running virtual machine expires, the timer 114 may send a timer interrupt to the virtual machine monitor that may invoke the virtual machine monitor to perform the virtual machine scheduling in order to change the ownership of the switch devices.

The virtual machine monitor 12 may comprise a scheduler loader 120 and scheduler manager 121. The virtual machine monitor 12 may further comprise one or more schedulers; however, one of the one or more schedulers is active to handle the scheduling request. In the embodiment as depicted in FIG. 1, the virtual machine monitor 12 may comprise an old scheduler 122 and a new scheduler 123 that may respectively implement a specific scheduling mechanism such as Borrowed Virtual Time (BVT) algorithm, Round Robin algorithm, etc.

Many technologies may be applied as a working mode for the old scheduler 122 and the new scheduler 123. For example, the virtual machine monitor 12 may always hold the old scheduler 122 as a default scheduler. Before the new scheduler 123 is loaded in the virtual machine monitor 12, the old scheduler 122 may be active to handle the scheduling request. After the new scheduler 123 is loaded, the new scheduler may be active to handle the scheduling request in place of the old scheduler. However, if the new scheduler 123 is unloaded from the virtual machine monitor 12, the old scheduler 122 may be active again until the virtual machine monitor 12 is loaded with another new scheduler. For another example, in some circumstances, the scheduler manager 121 may switch back to the old scheduler 122 even though the new scheduler 123 exists in the virtual machine monitor 12. For still another example, the virtual machine monitor 12 may unload the old scheduler 122 before or after loading the new scheduler 123.

The scheduler loader 120 may process a scheduler loading request from the service operating system 131 and load the new scheduler 123 in the virtual machine monitor 12 when the virtual machine monitor 12 or one or more of the virtual machines 13, $14_1$-$14_N$ is running. Software Images of the new scheduler 123 may be available from various resources, such as a website, local disk, data center image server, etc. Example for an implementation of the scheduler loader 120 may comprises a hypercall handler that may process a hypercall for scheduler loading from the service operating system 131 and load the software images of the new scheduler 123 in the virtual machine monitor 12.

The scheduler manager 121 may be responsible for activating one of the old scheduler 122 and the new scheduler 123 to handle the scheduling request when the virtual machine monitor 12 or one or more of the virtual machines 13, $14_1$-$14_N$ is running. The scheduler manager 121 may implement the scheduler activating in various ways. For example, the scheduler manager 121 may store a scheduler identifier to identify the scheduler that is active for the scheduling request. Before the new scheduler 123 is loaded in the virtual machine monitor 12, the scheduler manager 121 may store the old scheduler identifier in order to activate the old scheduler 122 to handle the scheduling request. After the new scheduler 123 is loaded, the scheduler manager 121 may replace the old scheduler identifier with the new scheduler identifier in order to activate the new scheduler to handle the scheduling request. However, when the new scheduler 123 is unloaded, the scheduler manager 121 may restore the old scheduler identifier to re-activate the old scheduler 122.

Figure 2:
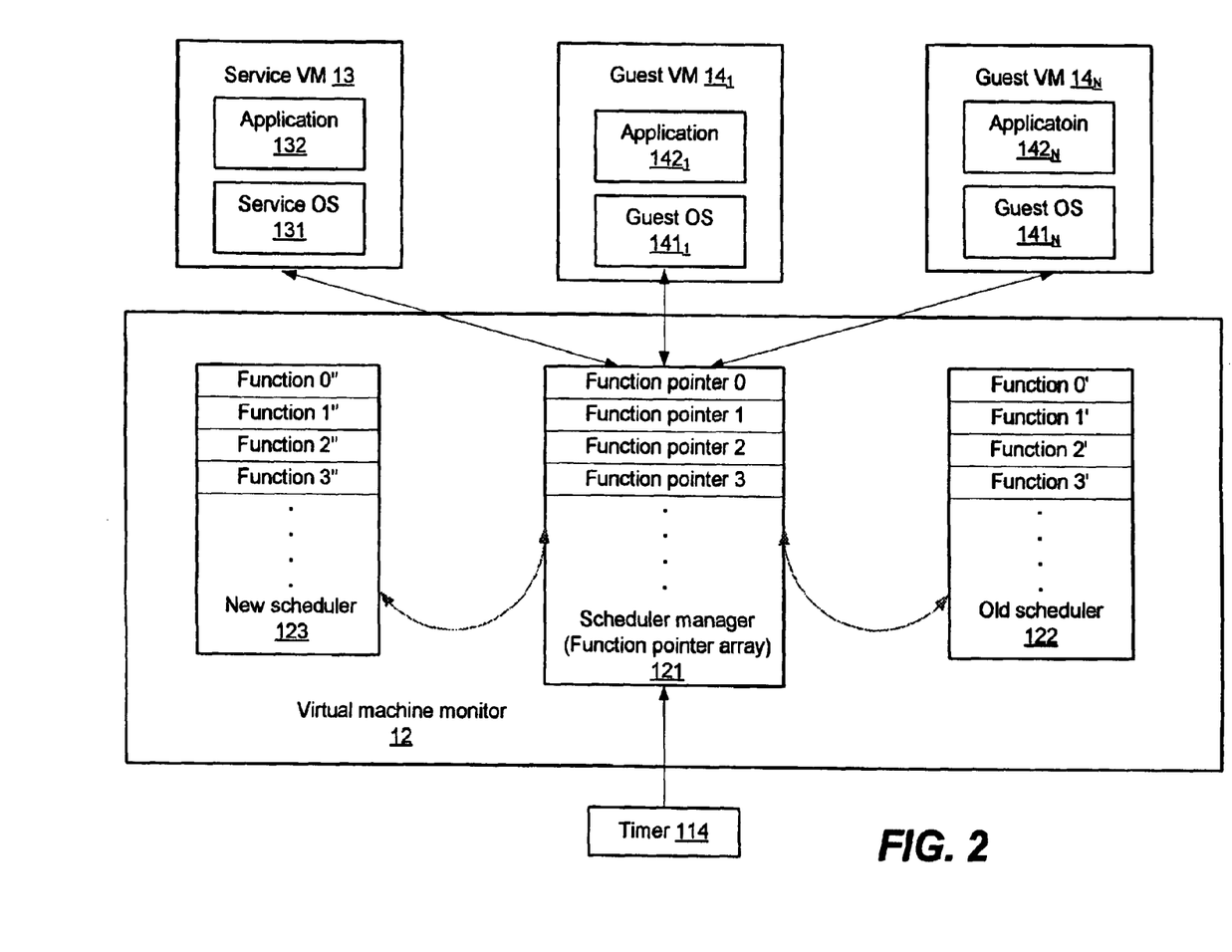
FIG. 2 shows an embodiment of a scheduler manager in the virtual machine monitor of FIG. 1.

For another example, the scheduler manager may store a function pointer array pointing to a function array of the active scheduler, e.g., a function array of the old scheduler 122 or the new scheduler 123 which is active to handle the scheduling request. FIG. 2 depicts an embodiment for an implementation of the scheduler manager 121. As depicted, the scheduler manager 121 may comprise the function pointer array having a plurality of function pointers (e.g., pointers 0, 1, 2, 3, etc.). Each of the old scheduler 122 and new scheduler 123 may perform the scheduling process with a plurality of routine functions that adhere to a particular application programming interface (API), e.g., functions 0', 1', 2', etc. of the old scheduler 122 or functions 0'', 1'', 2'', etc. of the new scheduler 123. Each pointer in the function pointer array 121 may point to an active scheduler function, e.g., a function of the old scheduler 122 or the new scheduler 123. The scheduling requester, such as a virtual machine 13 or $14_1$-$14_N$, timer 114 or other devices that may trigger a scheduling process in the virtual machine monitor 12, may include a pointer to the function pointer array and may call the active scheduler function by dereferencing its pointer to the function pointer array and then calling the functions pointed by the array.

In the embodiment depicted in FIG. 2, the scheduler manager 121 may activate the old scheduler 122 or the new scheduler 123 by updating the function pointer array to point to the active scheduler functions, or by updating the pointer of the scheduling requester to point to the function pointer array.

Referring back to FIG. 1, the scheduler manager 121 may be further responsible for transporting information between the active scheduler (e.g., the old scheduler 122 or the new scheduler 123) and the scheduling requester. For example, in response to receiving the scheduling request from the scheduling requester, the scheduler manager 121 may dispatch the scheduling request to the active scheduler identified by the scheduler identifier or to the active scheduler functions pointed by the function pointer array. The scheduler manager 121 may further send scheduling feedback information from the active scheduler to the scheduling requester. The scheduling feedback information may comprise a notification of the desired scheduling operation is performed correctly or not, a virtual machine priority information, and so on.

However, other embodiments may implement other technologies far the structure of the computer platform 10. For example, the scheduler manager 121 may be omitted and the scheduling requester may issue a direct request to the virtual machine monitor requiring the scheduling process, wherein addresses associated to the active scheduler are dynamically patched into the request during a scheduler model loading/unloading stage. With this means, the request may be sent to the active scheduler directly.

Figure 3:
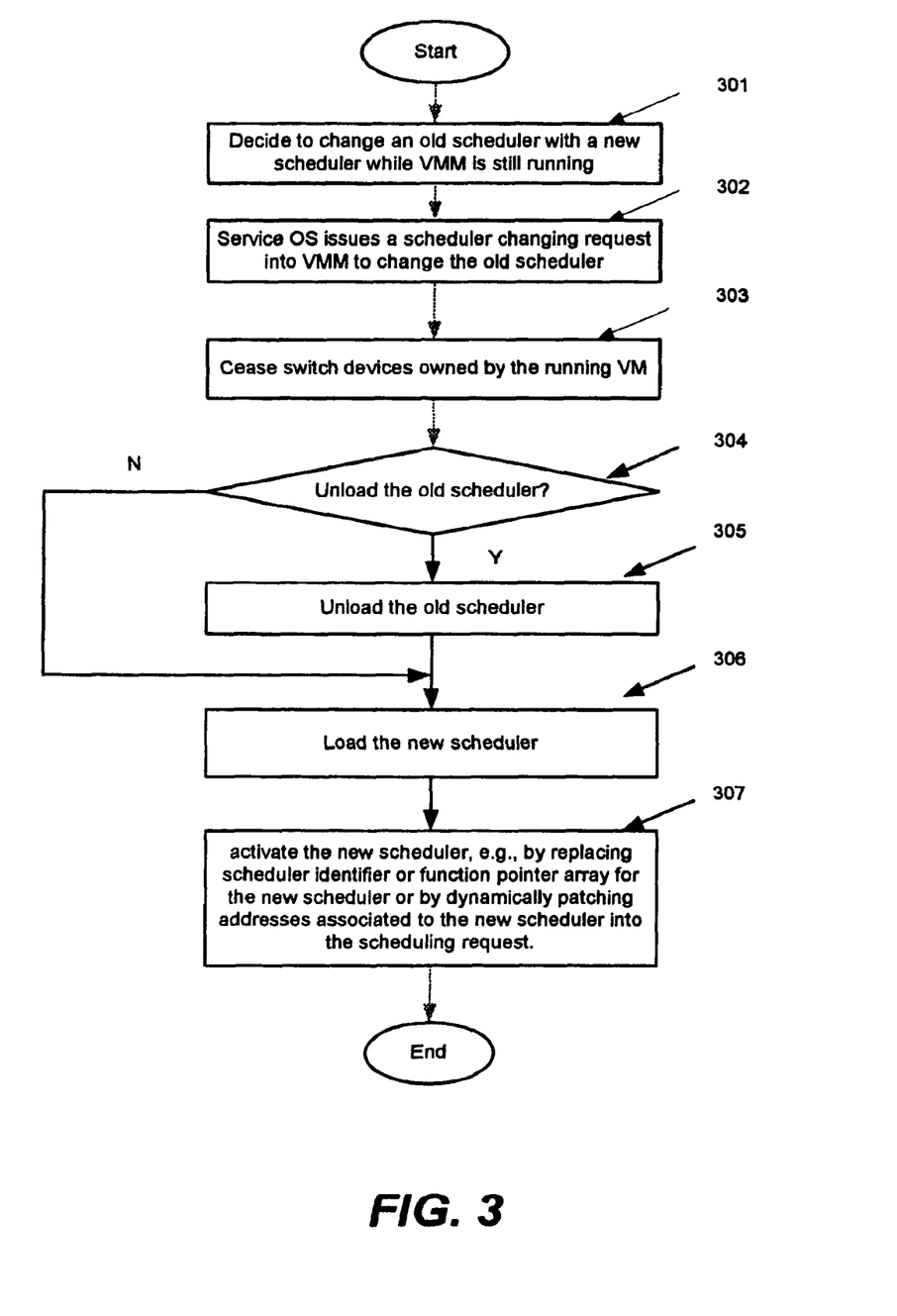
FIG. 3 shows an embodiment of a method of changing a scheduler in the virtual machine monitor of FIG. 1.

FIG. 3 depicts an embodiment of a method of changing a scheduler in the virtual machine monitor 12 as shown in FIG. 1. In block 301, a user or other suitable party may decide to change an old scheduler (e.g., the old scheduler 122) currently active to handle a scheduling request in the virtual machine monitor with a new scheduler (e.g., the scheduler 123) when the virtual machine monitor or one or more of the virtual machines is running. For example, a user may determine that the old scheduler is a poor fit for the current virtualization environment or that another schedule is a better fit for the current virtualization environment.

In block 302, the decision made in block 301 may invoke an application running over a service operating system in a service virtual machine (e.g., service operating system 131) with specified parameters and the application may pass the parameters and other information to the service operating system through a virtual machine control request, that may trigger the service operating system to issue a scheduler loading request into the virtual machine monitor to load the new scheduler. The specific parameters may comprise information on which scheduler is to be loaded, where the scheduler image is; what kind of loading policy the virtual machine monitor may apply to load the new scheduler, etc.

In block 303, a scheduler loader (e.g., the loader 120) or other suitable component may handle the loading request and cease all of switch devices owned by a running virtual machine, wherein the switch devices may comprise processor (s) and console devices. Various methods may be applied to perform the ceasing process. For processor ceasing, a cease sign may be input in all of virtual machine resume paths between all of virtual processor(s) in the virtual machine monitor and the running virtual machine. For console device ceasing, the virtual machine monitor may flush all of outstanding traffic by the help of console device models before the virtual machine monitor actually stop them. After the switch devices are ceased, the switch devices may reach a stable, consistent or predictable state so that the virtual machine monitor may retain their state for a next scheduling process.

In block 304, the scheduler loader or other suitable component may decide whether to unload the old scheduler from the virtual machine monitor before loading the new scheduler. In different circumstances, the scheduler loader may make different decision. For example, the scheduler loader may decide to reserve the old scheduler for a future use. However, if there is no free space for the new scheduler, the scheduler loader may decide to unload the old scheduler. In response to deciding to reserve the old scheduler, the scheduler loader or other suitable component may load the new scheduler in the virtual machine monitor with use of the parameters from the service operating system in block 306. However, in response to deciding to unload the old scheduler, the scheduler loader or other suitable component may unload the old scheduler from the virtual machine monitor in block 305 and then load the new scheduler in the virtual machine monitor in block 306. Other embodiments may implement other technologies for the scheduler unloading. For example, the scheduler loader may make a decision on whether to unload the old scheduler after the new scheduler is loaded.

In block 307, the new scheduler may be activated to handle the scheduling request in place of the old scheduler. For example, the scheduler manager 121 may activate the new scheduler by means of storing an identifier to identify the new scheduler or a function pointer array pointing to the new scheduler functions. For another example, the new scheduler may be activated by dynamically patching addresses associated with the new scheduler in the scheduler request so that a scheduling requester may directly call the new scheduler to perform the scheduling process.

Figure 4:
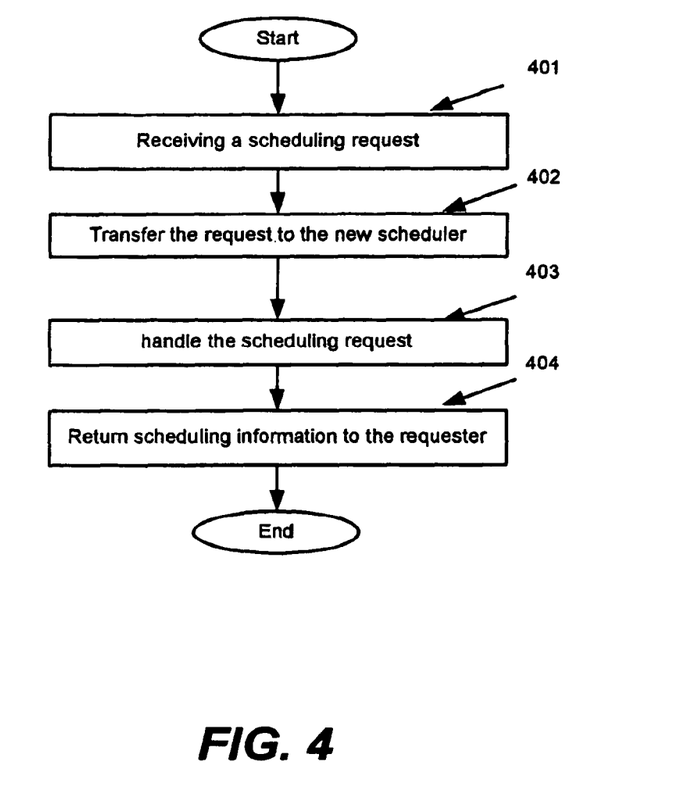
FIG. 4 shows an embodiment of a method of handling a scheduling request by the scheduler changed in FIG. 3.

FIG. 4 depicts an embodiment of a method of handling a scheduling request by the new scheduler changed in FIG. 3. In block 401, the virtual machine monitor may receive the scheduling request from the scheduling requester requiring a scheduling process. In block 402, the scheduling request may be transferred to the new scheduler, for example, through a scheduler manager (e.g., the scheduler manager 121) that may store an identifier to identify the new scheduler or a function pointer array pointing to a function array of the new scheduler.

In block 403, the new scheduler may handle the scheduling request, for example, determine a next owner of the switch devices or calculate a scheduling priority for a specific virtual machine. In block 404, the new scheduler may return scheduling feedback information to the scheduling requester. The scheduling feedback information may comprise a notification of the desired scheduling process is performed correctly or not, a virtual machine priority information, and so on.

Figure 5:
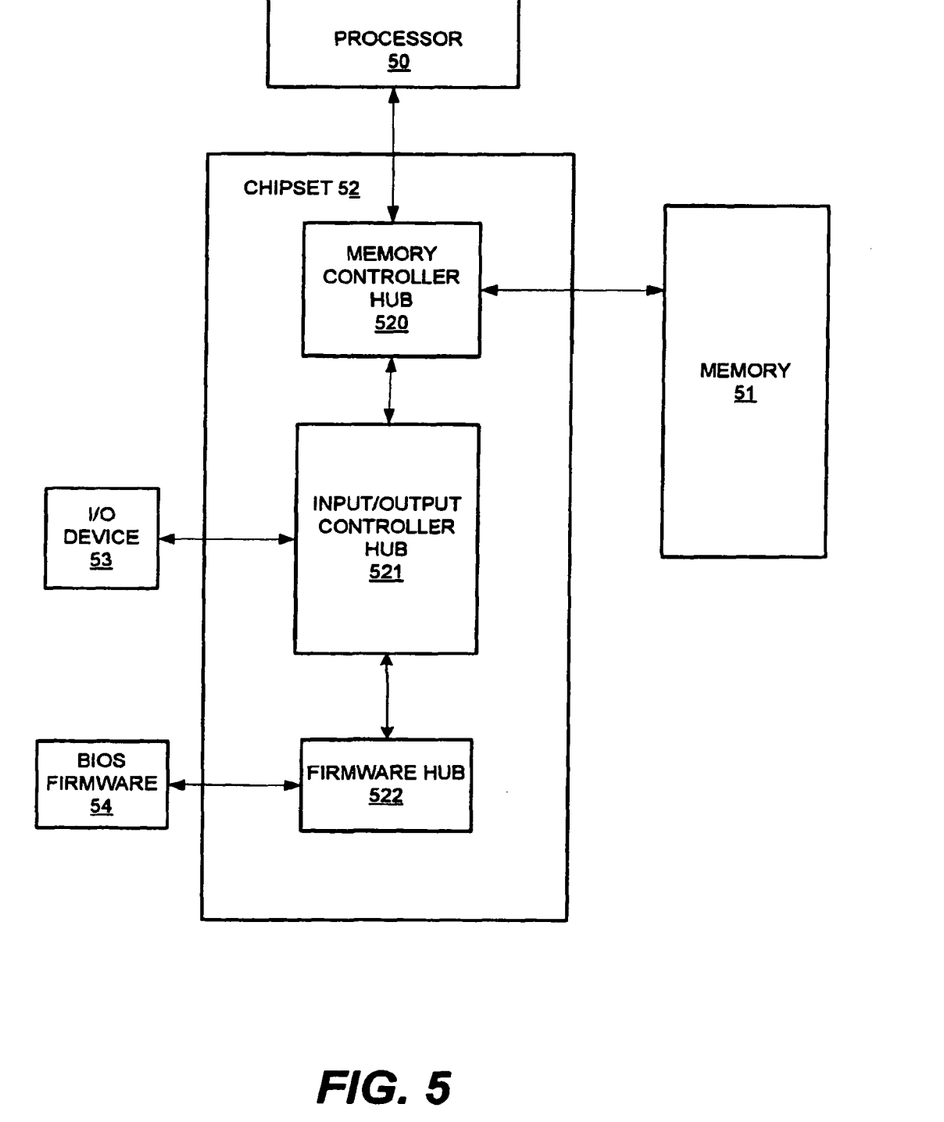
FIG. 5 shows an embodiment of a general computer platform having the virtual machine monitor of FIG. 1.

FIG. 5 depicts an embodiment of a general computer platform having the virtual machine monitor as shown in FIG. 1. The computing platform may comprise one or more processors 50, memory 51, chipset 52, I/O device 53, BIOS firmware 54 and the like. The one or more processors 50 are communicatively coupled to various components (e.g., the memory 51) via one or more buses such as a processor bus. The processors 50 may be implemented as an integrated circuit (IC) with one or more processing cores that may execute codes under a suitable architecture, for example, including Intel® Xeon™, Intel® Pentium™, Intel® Itanium™ architectures, available from Intel Corporation of Santa Clara, Calif.

In an embodiment, the memory 51 may store codes to be executed by the processor 50. A non-exhaustive list of examples for the memory 51 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, and the like.

In an embodiment, the chipset 52 may provide one or more communicative path among the processor 50, memory 51 and various components, such as the I/O device 53 and BIOS firmware 54. The chipset 52 may comprise a memory controller hub 520, an input/output controller hub 521 and a firmware hub 522.

In an embodiment, the memory controller hub 520 may provide a communication link to the processor bus that may connect with the processor 50 and to a suitable device such as the memory 51. The memory controller hub 520 may couple with the I/O controller hub 521 that may provide an interface to the I/O devices 53 for the computing platform such as a keyboard and a mouse. A non exhaustive list of examples for the I/O devices 13 may comprise a keyboard, mouse, network card, a storage device, a camera, a blue-tooth, an antenna, and the like.

In an embodiment, the memory controller hub 520 may communicatively couple with a firmware hub 522 via the input/output controller hub 521. The firmware hub 522 may couple with the BIOS firmware 54 that may store routines that the computing platform executes during system startup in order to initialize the processors 50, chipset 52, and other components of the computing platform. Moreover, the BIOS firmware 54 may comprise routines or drivers that the computing device 1 may execute to communicate with one or more components of the compute platform.

The computer platform as depict in FIG. 5 may perform as the computer platform 10 as depicted in FIG. 1. The memory 51 may store software images as a virtual machine monitor including a scheduler loader, one or more scheduler, and/or a scheduler manager. The memory 51 may further store service software including service operating system and service applications, and guest software including guest operating system and guest applications.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
    loading a second scheduler in a virtual machine monitor when the virtual machine monitor is running; and
    activating the loaded second scheduler to handle a scheduling request for a scheduling process in place of a first scheduler when the virtual machine monitor is running, wherein an address, corresponding to a function in a function pointer array and associated with the first scheduler, is to be dynamically patched into the scheduling request to allow the scheduling request to be sent to the second scheduler directly, wherein the loading further comprises ceasing device resources owned by a running virtual machine in response to receiving a scheduler changing request to change the first scheduler and loading the second scheduler in the virtual machine monitor based upon a scheduler parameter of the scheduler changing request.

2. The method of claim 1, wherein the loading further comprises unloading the first scheduler from the virtual machine monitor before loading the second scheduler.

3. The method of claim 1, wherein the activating further comprises:
    replacing a first scheduler identifier with a second scheduler identifier to route between the second scheduler and a requester that generated the scheduling request, when the virtual machine monitor is running.

4. The method of claim 1, wherein the activating comprises:
    replacing a first function pointer array pointing to a first function array of the first scheduler with a second function pointer array pointing to a second function array of the second scheduler to route between the second scheduler and a requester that generated the request, when the virtual machine monitor is running.

5. The method of claim 1, wherein the activating comprises dynamically patching an address associated with the second scheduler into the scheduling request when the virtual machine monitor is running.

6. The method of claim 1, further comprising:
    unloading the second scheduler from the virtual machine monitor when the virtual machine monitor is running; and
    re-activating the first scheduler to handle a scheduling request after the second scheduler has been unloaded.

7. The method of claim 1, wherein the virtual machine monitor is to comprise the function pointer array.

8. The method of claim 1, wherein the addresses associated with the first scheduler are to be dynamically patched into the scheduling request during a scheduler model loading or unloading stage.

9. A non-transitory computer-readable medium comprising one or more instructions that when executed on a processor configure the processor to perform one or more operations to:
    load a second scheduler in a virtual machine monitor when the virtual machine monitor is running; and
    activate the loaded second scheduler to handle a scheduling request for a scheduling process in place of a first scheduler when the virtual machine monitor is running, wherein an address, corresponding to a function in a function pointer array and associated with the first scheduler, is to be dynamically patched into the scheduling request to allow the scheduling request to be sent to the second scheduler directly,
    wherein the loading further comprises ceasing device resources owned by a running virtual machine in response to receiving a scheduler changing request to change the first scheduler and loading the second scheduler in the virtual machine monitor based upon a scheduler parameter of the scheduler changing request.

10. The computer-readable medium of claim 9, further comprising one or more instructions that when executed on the processor configure the processor to perform one or more operations to unload the first scheduler from the virtual machine monitor before loading the second scheduler.

11. The computer-readable medium of claim 9, further comprising one or more instructions that when executed on the processor configure the processor to perform one or more operations to replace a first scheduler identifier with a second scheduler identifier to route between the second scheduler and a requester that generated the scheduling request, when the virtual machine monitor is running.

12. The computer-readable medium of claim 9, further comprising one or more instructions that when executed on the processor configure the processor to perform one or more operations to replace a first function pointer array pointing to a first function array of the first scheduler with a second function pointer array pointing to a second function array of the second scheduler to route between the second scheduler and a requester that generated the request, when the virtual machine monitor is running.

13. The computer-readable medium of claim 9, further comprising one or more instructions that when executed on the processor configure the processor to perform one or more operations to dynamically patch an address associated with the second scheduler into the scheduling request when the virtual machine monitor is running.

14. The computer-readable medium of claim 9, further comprising one or more instructions that when executed on the processor configure the processor to perform one or more operations to: unload the second scheduler from the virtual machine monitor when the virtual machine monitor is running; and re-activate the first scheduler to handle a scheduling request after the second scheduler has been unloaded.

15. The computer-readable medium of claim 9, wherein the virtual machine monitor is to comprise the function pointer array.

16. The computer-readable medium of claim 9, further comprising one or more instructions that when executed on the processor configure the processor to perform one or more operations to dynamically patch the addresses associated with the first scheduler into the scheduling request during a scheduler model loading or unloading stage.

17. An apparatus comprising:
    a processor having one or more processing cores to:
        load a second scheduler in a virtual machine monitor when the virtual machine monitor is running; and
        activate the loaded second scheduler to handle a scheduling request for a scheduling process in place of a first scheduler when the virtual machine monitor is running, wherein an address, corresponding to a function in a function pointer array and associated with the first scheduler, is to be dynamically patched into the scheduling request to allow the scheduling request to be sent to the second scheduler directly, wherein the loading further comprises ceasing device resources owned by a running virtual machine in response to receiving a scheduler changing request to change the first scheduler and loading the second scheduler in the virtual machine monitor based upon a scheduler parameter of the scheduler changing request.

18. The processor of claim 17, wherein at least one of the one or more processing cores is to unload the first scheduler from the virtual machine monitor before loading the second scheduler.

19. The processor of claim 17, wherein at least one of the one or more processing cores is to replace a first scheduler identifier with a second scheduler identifier to route between the second scheduler and a requester that generated the scheduling request, when the virtual machine monitor is running.

20. The processor of claim 17, wherein at least one of the one or more processing cores is to replace a first function pointer array pointing to a first function array of the first scheduler with a second function pointer array pointing to a second function array of the second scheduler to route between the second scheduler and a requester that generated the request, when the virtual machine monitor is running.

21. The processor of claim 17, wherein at least one of the one or more processing cores is to dynamically patch an address associated with the second scheduler into the scheduling request when the virtual machine monitor is running.

22. The processor of claim 17, wherein at least one of the one or more processing cores is to:
    unload the second scheduler from the virtual machine monitor when the virtual machine monitor is running; and re-activate the first scheduler to handle a scheduling request after the second scheduler has been unloaded.

23. The processor of claim 17, wherein the virtual machine monitor is to comprise the function pointer array.

24. The processor of claim 17, wherein at least one of the one or more processing cores is to dynamically patch the addresses associated with the first scheduler into the scheduling request during a scheduler model loading or unloading stage.

* * * * *